United States Patent [19]
Parish

[11] 3,868,891
[45] Mar. 4, 1975

[54] MACHINES AND METHODS FOR THE MANUFACTURE OF CONTAINERS AND THE PRODUCT THEREFROM

[75] Inventor: Frank T. Parish, Frederick, Md.

[73] Assignee: Pressure Chemical Corporation, Charleston, W. Va.

[22] Filed: May 25, 1971

[21] Appl. No.: 146,684

Related U.S. Application Data

[63] Continuation-in-part of Ser. No. 78,023, Oct. 5, 1970, abandoned.

[52] U.S. Cl. ................................. 93/8 W, 93/8 VB
[51] Int. Cl. ........................... B31b 1/14, B31b 1/84
[58] Field of Search ...... 93/8 R, 8 W, 35 R, DIG. 1; 52/28; 156/513, 253, 252

[56] References Cited
UNITED STATES PATENTS

| | | | |
|---|---|---|---|
| 3,033,257 | 5/1962 | Luhber | 53/28 UX |
| 3,244,576 | 4/1966 | Swartz | 156/513 |
| 3,372,747 | 3/1968 | Grevich | 156/253 X |
| 3,389,643 | 6/1968 | Lemcke et al. | 156/513 X |
| 3,433,136 | 3/1969 | Hartbauer et al. | 43/8 R |
| 3,585,095 | 6/1971 | Shearhod | 156/513 |

Primary Examiner—Gerald A. Dost
Assistant Examiner—E. F. Desmond
Attorney, Agent, or Firm—Mason, Fenwick & Lawrence

[57] ABSTRACT

A machine and method for making multi-layer bags from a continuous sheets of plastic having an end-pull drive means, sealing means between the source of the plastic material and the end-pull and a means for decreasing the tear resistance between sealed containers.

8 Claims, 12 Drawing Figures

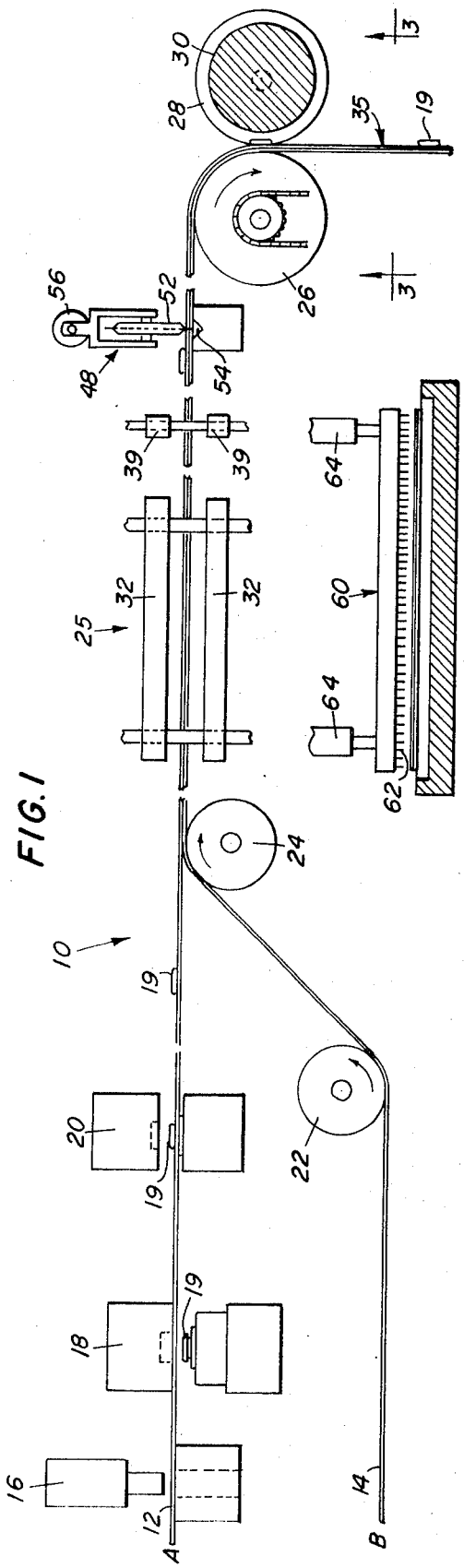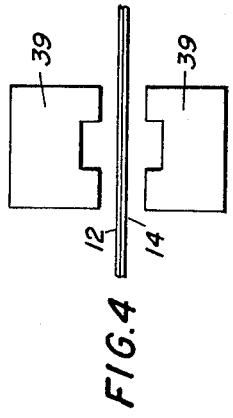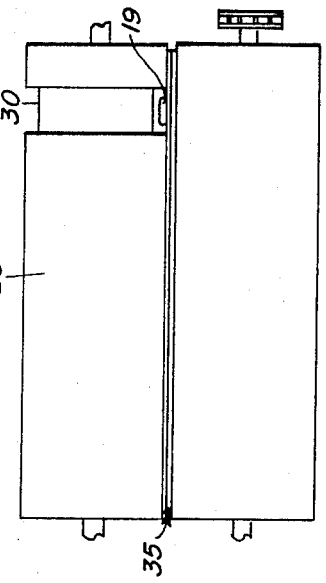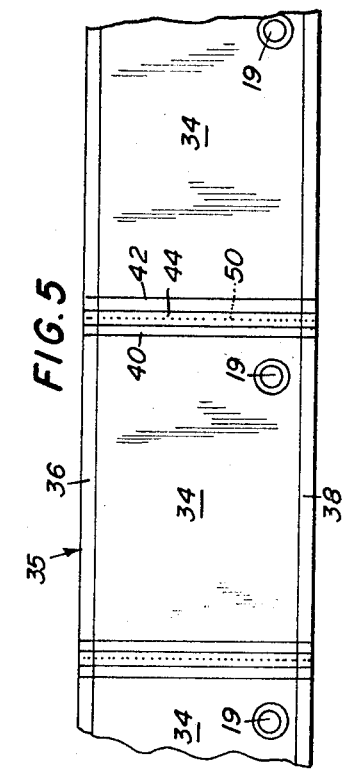

INVENTOR
FRANK PARISH

MACHINES AND METHODS FOR THE MANUFACTURE OF CONTAINERS AND THE PRODUCT THEREFROM

This is a continuation-in-part application of my copending application Ser. No. 78,023, filed Oct. 5, 1970, now abandoned, entitled APPARATUS AND METHOD FOR THE MANUFACTURE OF CONTAINERS AND THE PRODUCT THEREFROM.

This invention relates to the general field of container manufacture and more specifically relates to the field of making relatively large polyethylene bags which are heat sealed about their edges and have grommets in one surface thereof for the insertion of a dispensing nozzle. Bags of this type are commonly used in combination with a corrugated container for distribution of milk and other fluid products.

The containers described herein include an inner bag manufactured from plastic sheet material of the polyethylene type. In known techniques, first and second strips of polyethylene, normally two-ply, are fed from large reels to a heat sealing area. In one commonly used process, the strips are positioned in mating relationship with one another over the planar surface of a Teflon-coated fiberglass conveyor. Heat units having corresponding elements disposed over the strips and beneath the belt are provided for sealing the bag edges. As the heat sealing units are brought together, a seal is formed between a selected pattern to form the bags. During sealing, the heat also causes the lowermost sheet to "stick" or form a temporary bond with the Teflon coating. Upon movement of the conveyor, the bond between the plastic and conveyor acts as a drive causing a further length of plastic to be drawn or pulled from the reels. Prior to the bag reaching the end of the conveyor, it is severed. Because of the low-quality bond between the Teflon and lowermost surface of the bag, an operator can readily remove the severed bag at the end of the conveyor belt. Although the above method has been commercially successful, it has several disadvantages. First of all, the heating means must work through the thickness of the Teflon coated conveyor resulting in a time loss. Secondly, the conveyor belts are relatively expensive and thus add to the unit cost of the bags produced. Thirdly, the juncture of the conveyor belt ends is not of uniform thickness, nor does it have the same heat transferral character, as the belt itself. Heating through the joint creates a poor seal at these junctures. These problems are accentuated by the number of layers of which the container is made. The last disadvantage results in either a leakage problem or requires a reseal operation.

Therefore, a principal objective of this invention is to provide a bag manufacturing apparatus which overcomes the above-mentioned disadvantages.

A further objective of this invention is to provide large polyethylene bags which can be produced and manufactured in strip form for easy assembly and sealing by a user thereof.

Another objective of this invention is to provide improved apparatus for advancing a plurality of plastic sheets to a bag-making area.

A still further objective of this invention is to provide improved methods and apparatus for making containers of the multi-layered type wherein each layer can move independently of the other.

A further objective of this invention is to provide a bag-making apparatus of the type described which is rugged and simple in operation. The structure which attains this ruggedness and simplicity considerably reduces the down time normally associated with comparable prior art equipment.

A still further objective of the invention is to provide a bag making apparatus of the type described wherein the heat seal units thereof can have a reduced capacity due to the fact that they engage the bag surfaces directly without the necessity of penetrating a drive means such as a conveyor belt.

Another important objective of the invention is to provide an apparatus for making polyethylene bags of relatively large size by providing means to reduce incorrect sealing areas so as to substantially diminish any reseal or waste problems.

Another important objective of this invention is to provide a feed means for bag-making apparatus which receives its material from a reel source by providing pulling means at the free end of the strip material to draw material from said reels. Since the surfaces of the plastic bag are likely to be equipped with a relatively large nozzle or grommet member, the invention also encompasses the use of a nip roll means wherein one of said rolls is grooved to accommodate said grommet or nozzle mounting means.

Another important objective of this invention is to increase production rate in bag-making machines by reducing the amount of heat penetration necessary for a particular bag sealing operation.

A further objective of this invention is to provide an end-pull means which is adapted to reduce "ridging" in the grommet carrying sheet.

In containers having flexible bag within corrugated boxes, it is sometimes very advisable to have a multi-layered construction. Such a construction will diminish the effects of vibrations ancillary to long-haul operations and, when hauling some chemical substances, more than one type barrier is advisable to insure a no-leak operation. Therefore, an important objective of this invention is to provide apparatus and methods for producing flexible containers having three or more loose layered sheets of layers of material, heat-sealed at their edges but movable relative to one another in their planar surfaces.

These and other objects of the invention will become more apparent to those skilled in the art by reference to the following detailed description when viewed in light of the accompanying drawings wherein:

FIG. 1 is a diagrammatic schematic of a side elevation showing the bag-making process;

FIG. 2 is an alternate embodiment of the perforating means shown in FIG. 1;

FIG. 3 is an end view of the drive rolls;

FIG. 4 is an enlargement of one element of FIG. 1;

FIG. 5 is a view of reduced size showing a plan view of the finished article of manufacture;

Figure 6A:
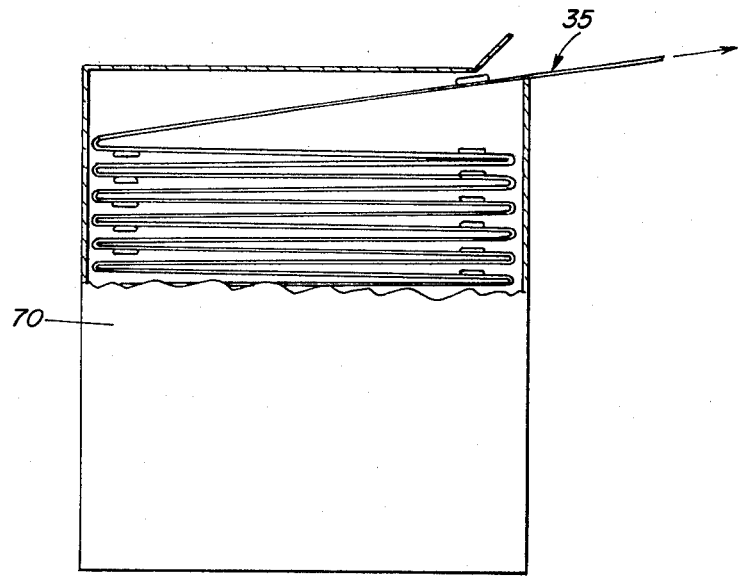
FIGS. 6a and 6b represent packaging arrangements which form a part of the invention.

Referring now to the drawings wherein like numerals indicate like parts, the numeral 10 indicates the bag-making apparatus of this invention. The bags are manufactured from a pair of plastic sheets 12 and 14. The plastic sheet 12 originates at a source indicated by the letter A and the sheet 14 originates at a source indicated by the letter B. Sources A and B are normally large drums or reels of polyethylene plastic. Oftentimes the plastic is fed as two or more ply sheets from two or more drums. The upper sheet 12, prior to arriving in mating relationship with the lower sheet 14, is apertured by a punch apparatus 16, a grommet 19 is inserted through the hole by a mechanism 18 and sealed thereto by a mechanism 20. Mechanisms 16, 18 and 20 are diagrammatically shown and are known to the prior art. For purposes of this disclosure, it is necessary to know that grommets 19 are inserted at regular bag-length intervals.

The lower sheet 14 is guided about an idler roll 22 to an upper idler 24. At this point the sheets 12 and 14 are brought into mating edge-to-edge relationship with one another and are then fed to the bag making area generally indicated by the numeral 25. At their outer or free ends, the sheets 12 and 14 are drawn from their reel assemblies by a drive roll 26 working in conjunction with a nip roll 28. The nip roll is grooved about its periphery at 30 to accommodate the grommets 19. It should be noted that the bag strip passes over the roller 26 prior to reaching any engagement with roller 28. This will reduce or eliminate any "ridging" or strip "pucker" caused because of the tensile force about the grommet operative. Ridging between the guide roll 24 and the drive roll must be eliminated or these ridges will cause unsatisfactory sealing.

The drive roll 26 is driven at regular timed intervals for drawing the plastic sheets one bag length between lulls of sufficient duration for sealing purposes. Immediately downstream of the guide rolls, and disposed over the edges of the sheets 12 and 14 after they have been brought into mating relationship, are heat seal units 32 (only nearest one shown in FIG. 1.) having an effective heat seal of one bag length. Seal units 32 create the edge seals 36 and 38 as shown in FIG. 5.

At the next station, one bag length from the ends of seal units 32, is an end sealer 39 for creating end seals 40 and 42 with an unsealed area 44 therebetween. At the next position, one bag length from unit 39, is a perforator assembly 48. Perforator 48 imparts a line of perforations 50 between the end seals 40 and 42 along the unsealed area 44. In the embodiments shown, the perforations are made by a spoked wheel 52 carried by a channel 54. The wheel traverses area 44 under the influence of a drive chain 56 during the lull period when preceding bags are receiving their side and end seals. As shown in FIG. 2, the perforations can also be accomplished by a bar 60 having a plurality of spaced perforating spikes 62 on the bottom surface thereof. The bar is vertically reciprocated by way of means such as a hydraulic or pneumatic jack system 64.

Many of the advantages of the mechanism heretofore described are accomplished by permitting the material to be drawn from sources A and B by the nip rolls at that end of the apparatus where the bags have already been formed. This permits the sealing apparatus to seal directly to the plastic itself since there is no supporting conveyor belt used in this system. The end drive is made possible by the perforator assembly. The perforator assembly makes a tear line 50 having only enough apertures to withstand the pulling stresses of the roller assembly but sufficient apertures to be relatively non-resistant to a tearing action imparted by an operator stationed near the end rolls.

Figure 6B:
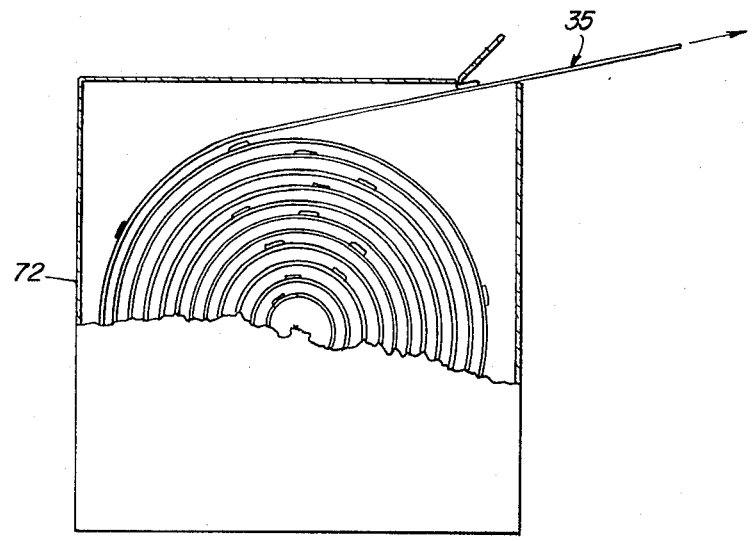
Figure 7:
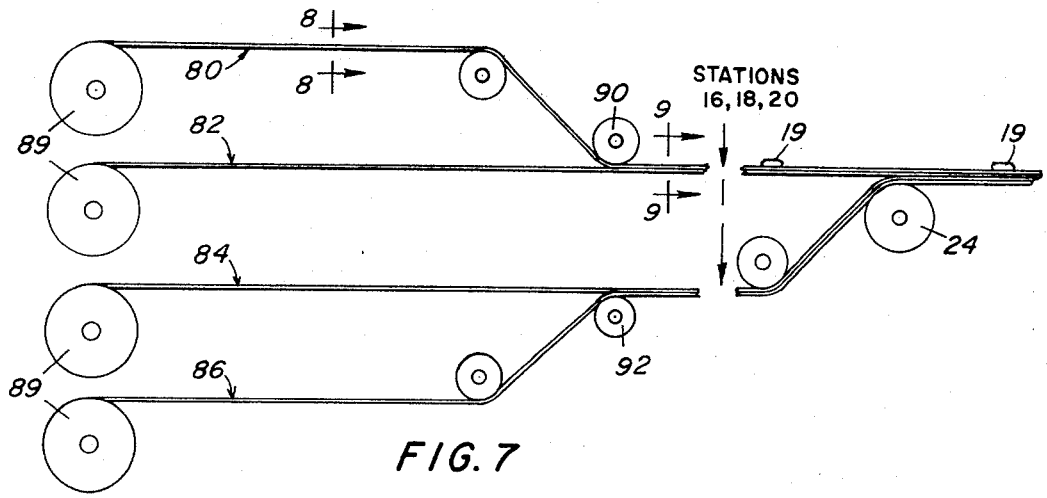
FIG. 7 is a diagrammatic side view of a means for feeding a plurality of sheets to the bag-making machinery.
Figure 8:
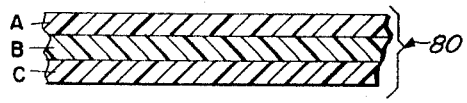
FIG. 8 is a cross-section along the line 8—8 of FIG. 7.

The above-identified apparatus, however, contributes more than a fast and convenient manner of producing bags. Heretofore, bags of this type have been shipped and stored as a separate, individual container. Hereafter such bags can be packaged in a container 70 for easy feeding at their point of use. Large flexible bags of the type described are difficult to handle individually in high-speed operation. However, by folding them in a container in strip form in accordian-like fashion, as shown in FIG. 6, a user is better able to use such bags in high-speed assembly operations such as feeding the bags from a source to a corrugated container erection machine. The bag strips may be conveniently fed from a roll as shown in FIG. 6b.

The effectiveness of a multi-layered container is in many instances increased by adding layers of material having the same and different characteristics. For instance, in storing and transporting a chemically active material, it is oftentimes necessary to provide a barrier other than polyethylene. Additionally, when the storage containers are to be transported great distances, the bag will wear through because the vibration of the transporting vehicle causes relative movement between the carton and the bag. This disadvantage can be substantially reduced by making bags of at least three layers. The heat sealing mechanism shown in FIG. 1 can accomplish the sealing through all layers because the heat must be transmitted through only the layers themselves.

Figure 9:
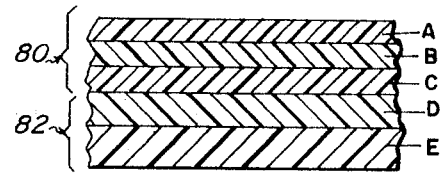
FIG. 9 is a cross-section along the line 9—9 of FIG. 7.

In FIG. 7 through FIG. 11, a feed mechanism and bag of the multi-layer type is disclosed. In this embodiment, a series of sheets of materials 80, 82, 84 and 86 are respectively fed from drums 89. The upper layers are brought together at guide roll 90 and the lower sheets are brought together at guide roll 92. The upper layers are subjected to the grommet insertion stations 16, 18 and 20 as in the previous embodiment. The sheets are then fed to the heat sealing apparatus after they pass about the roll 24. As seen in FIG. 9, the layers D and E are loose layed with respect to the sheet of Saranex and to each other. The Saranex is a single sheet having layers A, B and C. The layer D is, of course, loose-layed with respect to the layers C and E.

Figure 10:
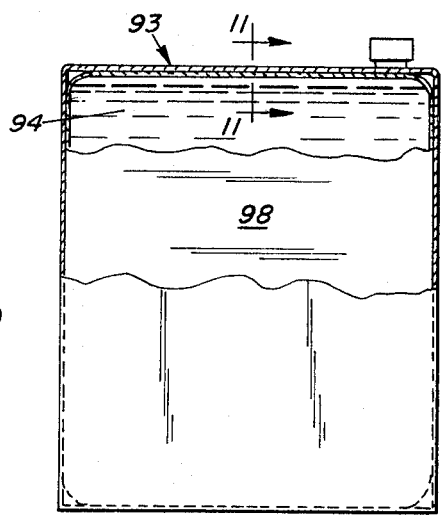
FIG. 10 is an elevational view of a completed multi-layer bag assembled within a carton and with portions broken away.
Figure 11:
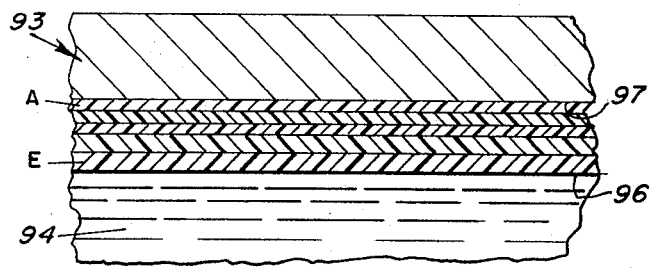
FIG. 11 is a cross-sectional view along the line 10—10 of FIG. 10.

In FIG. 10, a container filled with a liquid is disclosed. The container from the outside to the inside includes a corrugated box 93, the combined layer of Saranex material A-B-C, D and E and the liquid 94 to be contained therein. As the container 93 is transported, the corrugated portion is subject to vibration which results in certain movements of the liquid 94. The liquid 94 has an abrasive action against the inner surface 96 (FIG. 11) of layer E and a certain amount of relative movement will occur between the outer surface of layer A and the inner surface 97 of the corrugated 92. Since the layers are loose layed, a portion of these vibrations are dissipated by the relative movement permitted between layers D and E and the relative movement between the surface of the combined sheet A-B-C and the other surface of sheet D. In other words, there is relative sliding movement permitted along three surfaces. This greatly reduces vibration damages.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. Apparatus for the mass manufacture of bags from first and second continuous lengths of plastic strips having grommets at predetermined bag-length intervals in said first sheet, comprising in combination:
 a. first and second sources from which said strips extend to an end position,
 b. drive means at said end position for pulling strips from said sources at regular time intervals of sufficient duration to move said strips one of said bag lengths,
 c. guide means directing said first and second strips from their respective sources to a mating planar relationship with one another with their respective side edges in the same plane normal to the direction of strip movement,
 d. first sealing means between said guide means and said drive means sealing said edges together at bag-length intervals,
 e. second sealing means imparting end seals transversely of said strips between said edges at bag length intervals,
 f. perforating means weakening said strips through said end seals an amount sufficient to permit separation of one bag from its adjacent bags by relatively light tearing force but insufficient to cause bag separation because of the pulling forces of said drive means, and
 g. wherein said perforating means of paragraph (f) is a spiked wheel that moves transverse to said strip.

2. The invention of claim 1 wherein said drive means is a pair of drive rolls one of which has a peripheral groove to receive said grommet as said strips pass through.

3. The invention of claim 2 wherein the axes of said drive rolls are in a plane below the plane of said strip while being sealed.

4. The apparatus of claim 1 wherein each of said strips of plastic material are of at least two-ply form.

5. The appartus invention of claim 1, wherein said strip of plastic material from said first source is of a three-ply construction, and said other strip of plastic material from said second source is of at least a two-ply construction, said plies respectively being relatively shiftable to one another in the unsealed areas.

6. Apparatus for the mass manufacture of bags from first and second continuous lengths of plastic strips having grommets at predetermined bag-length intervals in said first sheet, comprising in combination:
 a. first and second sources from which said strips extend to an end position,
 b. drive means at said end position for pulling strips from said sources at regular time intervals of sufficient duration to move said strips one of said bag lengths,
 c. guide means directing said first and second strips from their respective sources to a mating planar relationship with one another with their respective side edges in the same plane normal to the direction of strip movement,
 d. first sealing means between said guide means and said drive means sealing said edges together at bag-length intervals,
 e. second sealing means imparting end seals transversely of said strips between said edges at bag-length intervals,
 f. perforating means weakening said strips through said end seals an amount sufficient to permit separation of one bag from its adjacent bags by relatively light tearing force but insufficient to cause bag separation because of the pulling forces of said drive means, and
 g. wherein said second sealing means of paragraph (e) impresses two seals defining a space therebetween and said perforating means traverses along said space.

7. The apparatus invention of claim 6 wherein each of said strips of plastic material are of at least two-ply form.

8. The invention of claim 6 wherein said perforating means is comprised of a bar having a plurality of pins.

* * * * *